United States Patent
Lachenmayer

[15] 3,661,184
[45] May 9, 1972

[54] TUBULAR CONSTRUCTION

[72] Inventor: Wilhelm Lachenmayer, Berleback, near, Germany

[73] Assignee: Benteler-Werke AG, Krs. Paderborn, Schloss Neuhaus, Germany

[22] Filed: Oct. 10, 1969

[21] Appl. No.: 865,283

[30] Foreign Application Priority Data

Nov. 26, 1968 Germany............P 18 10 957.4

[52] U.S. Cl. .................................138/89, 138/96, 215/47
[51] Int. Cl. .....................................F16l 57/02, B65d 59/02
[58] Field of Search...............138/89, 96 R, 96 T; 222/546; 220/42 C, 24 R; 215/38 A, 47

[56] References Cited

UNITED STATES PATENTS

| | | | |
|---|---|---|---|
| 2,940,627 | 6/1960 | Schultz | 215/47 |
| 2,870,906 | 1/1959 | Harkness et al. | 215/47 X |
| 3,109,549 | 11/1963 | Conklin | 215/47 |
| 3,104,681 | 9/1963 | Gray, Jr. | 220/24 X |
| 3,200,984 | 8/1965 | Fueslein et al. | 138/89 X |

FOREIGN PATENTS OR APPLICATIONS 797,771 7/1958 Great Britain .................222/546

*Primary Examiner*—Carlton R. Croyle
*Assistant Examiner*—Richard J. Sher
*Attorney*—Michael S. Striker

[57] ABSTRACT

An elongated tubular member having open ends with radial end faces surrounding the respective open ends. A corrosion-resistant and protective plug member having a flange portion is received in each of the open ends with the flange portion overlying the respective radial end face. An insulating jacket surrounds the tubular member and has its end portions formed into radially inwardly extending circumferential beads which abut against and are sealed to the respective flange portions of the plug members so as to fixedly secure the latter in the open ends.

11 Claims, 3 Drawing Figures

PATENTED MAY 9 1972  3,661,184
Fig. 1
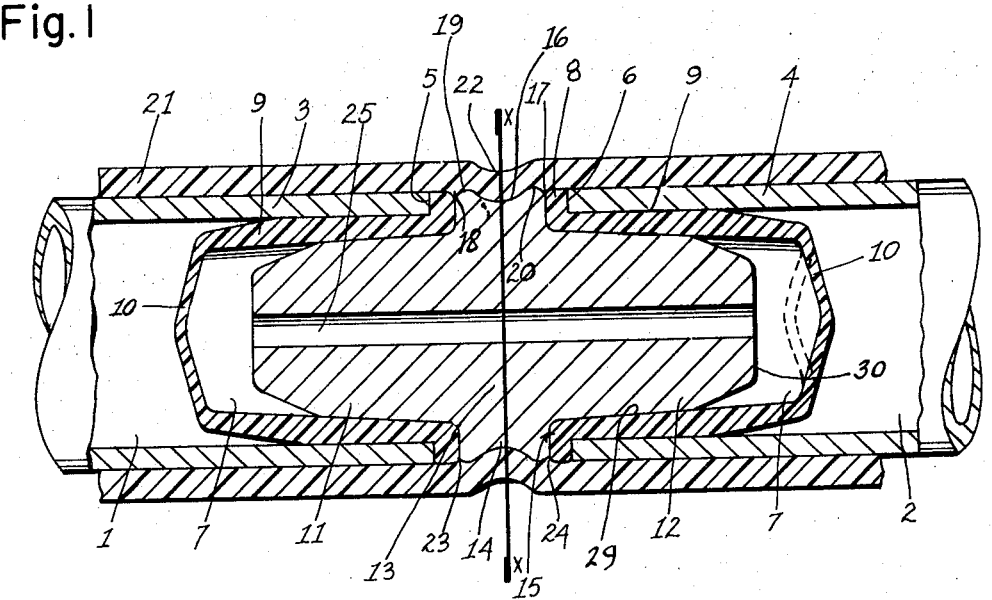
Fig. 2
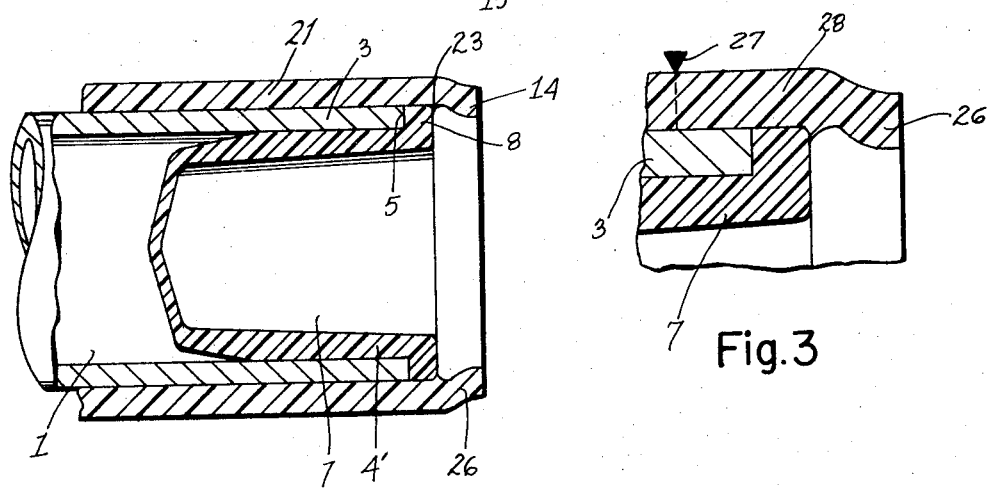
Fig. 3
INVENTOR
WILHELM LACHENMAYER
BY
ATTORNEY

TUBULAR CONSTRUCTION

BACKGROUND OF THE INVENTION

The present invention relates to a tubular construction especially adapted for use in heat-and-water installation applications and which incorporates an elongated tubular member provided with a heat-and-sound insulating jacket and corrosion-resistant protective plugs received in the open ends of the elongated tubular member.

Tubular constructions are known in which the interior of a metal tubular member is sealed from the atmosphere by means of stoppers plugged into the open ends of the tubular member.

Such conventional stoppers, however, have the disadvantage that they insufficiently protect the respective end sections of the tubular member against physical damage, for example during storage and transportation thereof, and that they are too easily disconnectable from these end sections and are lost, for example during mechanical lifting of the tubular member at the plugged ends thereof, with the result that the interior of the metal tubular member then is subjected to corrosion due to atmospheric influences.

SUMMARY OF THE INVENTION

The object of the subject invention is to overcome the above disadvantages and to provide a tubular construction in which an elongated tubular member, made of metal, such as steel, and enclosed by an insulating jacket, is provided with corrosion resistant protective plugs which are received and fixed in the respective open ends of the tubular member and are sealingly connected to end portions of the insulating jacket so as to form an absolute protection for the interior of the tubular member against corrosion and, in addition, to constitute a positive protection for the end sections of the tubular member against physical damage.

A further object of the invention is to provide a method of manufacturing such a tubular construction and which comprises the steps of producing a pair of elongated tubular members having opposing open sides and a radial end face surrounding each of the open ends; closing each of the opposing ends with discrete corrosion resistant resilient insert means each including an annular portion overlying the respective radial end face; aligning the pair of tubular members and substantially juxtaposing the annular portions with a constriction therebetween; surrounding both of the tubular members with insulating jacket means, including the constriction between the tubular members; deforming the jacket means adjacent each of the annular portions of the insert means such as to obtain a pair of parallel radially inwardly extending circumferential beads each abutting against its respective annular portion so as to confine the same between the radial end face of the open end and the bead; heat welding the radially inwardly extending circumferential beads to their respective annular portions so as to constitute an airtight seal between the beads and their respective annular portions; and severing the jacket means intermediate the annular portions in the region of the constriction therebetween to thereby obtain two discrete insulated and hermetically closed tubular elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 in part, shows a longitudinal cross-sectional view of opposing end portions of a pair of elongated tubular members, and illustrates the manner of manufacturing a plug construction for tubular members in accordance with the present invention;

FIG. 2 shows a part cross-sectional view of the end portion of a tubular member provided with a plug construction according to FIG. 1; and FIG. 3, in part, shows a cross-sectional view of the sealing connection between the plug construction of FIG. 1 and an insulating jacket surrounding the tubular members of FIGS. 1 and 2.

DESCRIPTION OF THE PREFERRED EMBODIMENT

Referring now to the drawings in which like reference numerals index like parts, and with attention initially directed to FIG. 1, a pair of axially aligned elongated tubular members 1 and 2, made of metal, such as steel, and for example continuously made, such as by drawing or any other conventional manner, are seen to comprise opposing end portions 3 and 4 each having a radial end face 5 and 6.

Pressed into the respective end portions 3 and 4 are identical substantially cup-shaped hollow plugs 7, made of a corrosion-resistant material, such as synthetic plastic. The plugs 7 are axially aligned in the direction of elongation of the tubular members 1 and 2, and each includes an open end with a circumferential flange portion 8 which surrounds the open end, a circumferential wall 9, and a bottom or end wall 10.

The flange portions 8 overlie the radial end faces 5 and 6 in abutting engagement and have an outer diameter which is substantially equal to the outer diameter of the tubular members 1 and 2.

The inner surfaces of the circumferential walls 9 are symmetrically conically tapered in direction toward the end walls 10 and are seen to be of a thickness considerably larger than the thickness of the end walls 10 which, preferably, are slightly tapered or curved in direction away from the open ends of the plugs.

In direction towards the end walls 10 and away from the open ends of the plugs, the outer surfaces of the circumferential wall 9 are slightly inwardly bent so as to facilitate insertion of the plugs into the respective open ends.

Interconnecting the tubular members 1 and 2, and pressed into the respective hollow interiors of the plugs 7, are opposite arms 11 and 12 of a symmetrical alignment and spacing member, generally indicated at 13. Intermediate the opposite arms 11 and 12 of the alignment and spacing member 13, is an annular circumferential enlargement 14 having side walls 15 in direction of which the tubular members 1 and 2 are axially moved till the flange portions 8 firmly abut against these side walls and are spaced from each other by a width corresponding to the width of the enlargement 14.

The arms 11 and 12 have circumferential walls 29 and end walls 30. As shown, the circumferential walls 29 are conically tapered to a degree substantially corresponding to the conicity of the inner surfaces of the plugs 7. However, towards the end walls 30, the arms 11 and 12 are more acutely tapered than the remainder of the circumferential wall so as to facilitate insertion of the arms into the respective plugs.

Due to their corresponding conicity, the arms 11 and 12 firmly press the adjoining wall portions of the plugs 7 against adjacent wall portions of the inner surfaces of the tubular members 1 and 2.

The enlargement 14 along its outer circumference, is arranged with a substantially inwardly curved groove 16 which arcuately extends across substantially the entire width of this outer circumference and forms a constriction in the same.

Flanking the groove 16 at opposite sides thereof, are additional circumferential grooves 17 and 18 which extend radially inwardly and are formed upon abutting engagement of the flange portions 8 with the respective side walls 15 of the enlargement 14 and are defined by the space in between the apices of the sloping ridges 19 and 20, which bound the width of the groove 16, and adjoining opposite portions of the outer circumference of the circumferential flange portions 8, as shown in the drawings.

The circumferential grooves 17 and 18 are shown as having a substantially triangular configuration, however, it will be understood that these grooves may have any other suitable shape.

The tubular members 1 and 2 thus closed by the plugs 7 and axially aligned and spaced with respect to each other by the alignment and spacing member 13, are then provided with a heat-and-sound insulating jacket 21 which preferably consists of a layer of synthetic plastic material applied over the circumference of the tubular members.

This application or deposition of the layer material is carried out under elevated temperature, preferably, and for example, in an extruder which has a nozzle portion through which a plurality of tubular elements, interconnected, aligned and spaced as hereinbefore described, are sequentially conveyed so as to obtain an overall even and tight adherence of the layer material to the tubular members.

The jacket 21 is continuously applied over the axially aligned tubular members 1 and 2, including the transition between the flange portions 8 constituted by the enlargement 14.

During deposition of the layer material or jacket 21, a constriction 22 is formed therein at the location of the enlargement 14 as a result of the constriction formed by the groove 16 in the outer circumference of the enlargement.

Also by applying this layer over the circumference of the tubular members 1 and 2 and the transition therebetween, two parallel radially inwardly extending circumferential beads 23 and 24 are formed in the radially inwardly extending circumferential grooves 17 and 18. Due to the elevated temperature under which the jacket 21 is applied, the circumferential beads 23 and 24 are automatically welded to the adjoining portions of the flange portions 8 so as to form an hermetic seal between the plugs 7 and the jacket 21.

During passage of the respective tubular members through the nozzle of the extruder in order to be coated with the jacket 21, increase in volume of air occurs in the respective tubular members and the interiors of the plugs 7.

To this end, a pressure-equalizing channel 25 is provided in the alignment and spacing member 13. As shown, this channel 25 extends axially through the alignment and spacing member 13 and intercommunicates the respective interiors of the plugs 7.

Expansion of air in the tubular member 1 causes the thin end wall 10 of the left-hand plug 7 to bend inwardly in direction of the open end of the plug.

This pressure by the expanded air on the end wall 10, in turn, causes the air entrapped within the interior of the left-hand plug to flow through the channel 25 and into the interior of the right-hand plug.

Consequently, expansion of air in the tubular member 2 causes the thin wall 10 of the right-hand plug to bend inwardly as a result of which the air entrapped within the interior of this plug is caused to flow through the channel 25 and into the interior of the left-hand plug.

It will be appreciated, that even though only two tubular members have been illustratively and exemplary shown, it lies within the scope of the present invention that a great number of tubular elements may be interconnected, aligned and spaced relative to each other and provided with an insulating jacket and closure members in the manner as hereinbefore described.

It will further be appreciated that each tubular member is provided at both ends with plug members as hereinbefore described.

Following deposition of the layer material, the tubular members 1 and 2 are disconnected from each other by severing the jacket 21 along a path X defined in the constriction 22 in the jacket and by subsequent removal of the arms 11 and 12 from their respective plugs 7.

The end product obtained is diagrammatically illustrated in FIG. 2.

Shown therein, is the end portion 3 of the tubular member 1 provided with the plug 7 whose flange portion 8 abuttingly overlies the radial end face 5. Locking the flange portion 8 in the position as shown, is the circumferential radially inwardly extending bead 23 of the jacket 21, which abuts against and is sealed with the adjoining portion of the flange portion 8.

In the manner described, the exterior surface of the tubular member is protected by the jacket 21 while the interior of the tubular member is protected against corrosion by the hermetic seal constituted by the flange portion 8 of the plug 7 and the bead 23.

In addition, the end portions of the tubular member have become shock-absorbent as a result of the substantially radially inwardly extending portions 26 of the jacket 21.

FIG. 3 illustratively shows the manner in which the plug 7 may be removed from the tubular member.

Prior to using the tubular member, for example prior to welding or soldering of the respective end portions, the jacket 21, at the location indicated by the arrow 27, may be circumferentially cut by a mechanical cutting device, such as a knife, saw or the like.

Removal of the end portion 28 of the jacket 21 permits subsequent removal of the plug 7 from the end portion 3 of the tubular movement.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An article of the character described, comprising an elongated tubular member having smooth inner and outer surfaces of uniform diameter throughout the length of the tubular member and opposite open ends and a radial end face surrounding each of said opposite ends; insert means closing each of said open ends and including a cup-shaped portion received in the open end and an annular portion overlying said radial end face; and jacket means tightly surrounding said outer surface of the tubular member over the whole length of the latter for insulating said tubular member, said jacket means having end portions adjacent said open ends and each provided with a radially inwardly extending circumferential bead abutting against the annular portion of the respective insert means and confining said annular portion between said radial end face and said bead.

2. An article as defined in claim 1, wherein said cup-shaped portion has a closed end and an open end adjacent said annular portion, and wherein said cup-shaped portion is tapered in direction of said closed end thereof.

3. An article as defined in claim 2, wherein said closed end includes an end wall which tapers substantially conically in direction away from said open end.

4. An article as defined in claim 2, wherein said closed end includes an end wall which is curved in direction away from said open end.

5. An article as defined in claim 2, wherein said annular portion has an outer diameter substantially equal to the outer diameter of said radial end face.

6. An article as defined in claim 2, wherein said tapered cup-shaped portion has an outer diameter slightly larger than the inner diameter of said inner surface.

7. An article as defined in claim 1, wherein said insert means includes an end wall and a circumferential wall adjacent said annular portion, and wherein said end wall is of a thickness substantially smaller than the thickness of said circumferential wall.

8. An article as defined in claim 1, wherein said insert means is made of a corrosion-resistant material.

9. An article as defined in claim 8, wherein said insert means is made of a synthetic plastic material.

10. An article as defined in claim 1, wherein said jacket means is a layer of synthetic plastic material.

11. An article as defined in claim 1, wherein said circumferential bead of said jacket means and said annular portions of said insert means are secured to each other and constitute an air tight seal.

* * * * *